US007306037B2

(12) United States Patent
Nguyen et al.

(10) Patent No.: US 7,306,037 B2
(45) Date of Patent: *Dec. 11, 2007

(54) COMPOSITIONS AND METHODS FOR PARTICULATE CONSOLIDATION

(75) Inventors: Philip D. Nguyen, Duncan, OK (US); Johnny A. Barton, Marlow, OK (US); Jimmie D. Weaver, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 324 days.

This patent is subject to a terminal disclaimer.

(21) Appl. No.: 10/944,973

(22) Filed: Sep. 20, 2004

(65) Prior Publication Data

US 2005/0051331 A1    Mar. 10, 2005

Related U.S. Application Data

(63) Continuation-in-part of application No. 10/408,800, filed on Apr. 7, 2003, now Pat. No. 7,114,570.

(51) Int. Cl.
   *E21B 33/138* (2006.01)
(52) U.S. Cl. ...................... 166/295; 166/300
(58) Field of Classification Search ............... None
   See application file for complete search history.

(56) References Cited

U.S. PATENT DOCUMENTS

| 2,238,671 | A | 4/1941 | Woodhouse | 166/21 |
|---|---|---|---|---|
| 2,703,316 | A | 3/1955 | Schneider | 260/78.3 |
| 2,869,642 | A | 1/1959 | McKay et al. | |
| 3,047,067 | A | 7/1962 | Williams et al. | 166/33 |
| 3,176,768 | A | 4/1965 | Brandt et al. | 166/33 |
| 3,272,650 | A | 9/1966 | MacVittie | 134/7 |
| 3,316,965 | A | 5/1967 | Watanabe | 166/33 |
| 3,336,980 | A | 8/1967 | Rike | 166/295 |
| 3,375,872 | A | 4/1968 | McLaughlin et al. | 166/29 |
| 3,404,735 | A | 10/1968 | Young et al. | 166/33 |
| 3,415,320 | A | 12/1968 | Young | 166/33 |
| 3,492,147 | A | 1/1970 | Young et al. | 117/62.2 |
| 3,659,651 | A | 5/1972 | Graham | 166/280 |
| 3,681,287 | A | 8/1972 | Brown et al. | 260/67 |
| 3,708,013 | A | 1/1973 | Dismuke | 166/276 |
| 3,709,298 | A | 1/1973 | Pramann | 166/276 |
| 3,754,598 | A | 8/1973 | Holloway, Jr. | 166/249 |
| 3,765,804 | A | 10/1973 | Brandon | 417/540 |
| 3,768,564 | A | 10/1973 | Knox et al. | 166/307 |
| 3,784,585 | A | 1/1974 | Schmitt et al. | 260/861 |
| 3,819,525 | A | 6/1974 | Hattenbrun | 252/132 |
| 3,828,854 | A | 8/1974 | Templeton et al. | 166/307 |
| 3,842,911 | A | 10/1974 | Know et al. | 166/307 |
| 3,854,533 | A | 12/1974 | Gurley et al. | 166/276 |
| 3,857,444 | A | 12/1974 | Copeland | 166/276 |
| 3,863,709 | A | 2/1975 | Fitch | 165/1 |
| 3,868,998 | A | 3/1975 | Lybarger et al. | 166/278 |
| 3,888,311 | A | 6/1975 | Cooke, Jr. | 166/280 |
| 3,912,692 | A | 10/1975 | Casey et al. | 260/78.3 |
| 3,948,672 | A | 4/1976 | Harnberger | 106/90 |
| 3,955,993 | A | 5/1976 | Curtice | 106/90 |
| 3,960,736 | A | 6/1976 | Free et al. | 252/8.55 R |
| 4,008,763 | A | 2/1977 | Lowe et al. | 166/253 |
| 4,029,148 | A | 6/1977 | Emery | 166/250.1 |
| 4,042,032 | A | 8/1977 | Anderson et al. | 166/276 |
| 4,070,865 | A | 1/1978 | McLaughlin | 61/36 |
| 4,074,760 | A | 2/1978 | Copeland et al. | 166/276 |
| 4,127,173 | A | 11/1978 | Watkins et al. | 166/276 |
| 4,169,798 | A | 10/1979 | DeMartino | 252/8.55 R |
| 4,172,066 | A | 10/1979 | Zweigle et al. | 260/29.6 TA |
| 4,245,702 | A | 1/1981 | Haafkens et al. | 166/307 |
| 4,273,187 | A | 6/1981 | Satter et al. | 166/250 |
| 4,291,766 | A | 9/1981 | Davies et al. | 166/276 |

(Continued)

FOREIGN PATENT DOCUMENTS

| CA | 2063877 | | 5/2003 |
|---|---|---|---|
| EP | 0313243 | B1 | 10/1988 |
| EP | 0528595 | A1 | 8/1992 |
| EP | 0510762 | A2 | 11/1992 |
| EP | 0643196 | A2 | 6/1994 |
| EP | 0834644 | A2 | 4/1998 |

(Continued)

OTHER PUBLICATIONS

S. W. Almond, et al., "*Factors Affecting Proppant Flowback With Resin Coated Proppants*," Society of Petroleum Engineers, Inc., SPE 30096, p. 171-186, 1995.

(Continued)

*Primary Examiner*—Zakiya W. Bates
(74) *Attorney, Agent, or Firm*—Robert A. Kent; Baker Botts

(57) ABSTRACT

A method of consolidating a proppant particulates comprising substantially coating proppant particulates with an integrated consolidation fluid comprising a hardening agent that itself comprises a piperazine, a derivative of piperazine, or a combination thereof; placing the coated proppant particulates into a portion of a subterranean formation; and, allowing the integrated consolidation fluid to substantially cure. A method of stabilizing a portion of a subterranean formation comprising applying a preflush solution to the subterranean formation; applying an integrated consolidation fluid to the subterranean formation, wherein the integrated consolidation fluid comprises a hardening agent component itself comprising a piperazine, a derivative of piperazine, or a combination thereof; and, allowing the integrated consolidation fluid to substantially cure. An integrated consolidation fluid capable of consolidating a subterranean formation comprising a hardenable resin component and a hardening agent component itself comprising a piperazine, a derivative of piperazine, or a combination thereof.

26 Claims, No Drawings

U.S. PATENT DOCUMENTS

| | | | |
|---|---|---|---|
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,105,886 A | 4/1992 | Strubhar | 166/280 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,247,059 A | 9/1993 | Gruber et al. | 526/354 |
| 5,249,628 A | 10/1993 | Surjaatmadja | 166/305 |
| 5,256,729 A | 10/1993 | Kutts et al. | 524/700 |
| 5,273,115 A | 12/1993 | Spafford | 166/281 |
| 5,293,939 A | 3/1994 | Surles et al. | 166/295 |
| 5,295,542 A | 3/1994 | Cole et al. | 166/278 |
| 5,396,957 A | 3/1994 | Surjaatmadja et al. | 166/308 |
| 5,320,171 A | 6/1994 | Laramay | 166/285 |
| 5,321,062 A | 6/1994 | Landrum et al. | 523/414 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,363,916 A | 11/1994 | Himes et al. | 166/276 |
| 5,373,901 A | 12/1994 | Norman et al. | 166/300 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,494,103 A | 2/1996 | Surjaatmadja et al. | 166/222 |
| 5,494,178 A | 2/1996 | Nguyen et al. | 166/276 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |

| Patent | Date | Inventor | Class |
|---|---|---|---|
| 5,670,473 A | 9/1997 | Scepanski | 510/445 |
| 5,697,440 A | 12/1997 | Weaver et al. | 166/281 |
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/295 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/280 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,877 A | 10/1999 | Funkhouser et al. | 166/270 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/295 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,187,839 B1 | 2/2001 | Eoff et al. | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,644 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B2 | 12/2001 | Chatterji et al. | 166/295 |
| 6,350,309 B2 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngsman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B2 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengal et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |

| | | | |
|---|---|---|---|
| 6,503,870 B2 | 1/2003 | Griffith et al. ............... 507/219 |
| 6,508,305 B1 | 1/2003 | Brannon et al. ............. 166/293 |
| 6,527,051 B1 | 3/2003 | Reddy et al. ................ 166/300 |
| 6,528,157 B1 | 3/2003 | Hussain et al. .............. 428/325 |
| 6,531,427 B1 | 3/2003 | Shuchart et al. ............ 507/267 |
| 6,538,576 B1 | 3/2003 | Schultz et al. ............ 340/859.6 |
| 6,543,545 B1 | 4/2003 | Chatterji et al. ............. 166/381 |
| 6,552,333 B1 | 4/2003 | Storm et al. .............. 250/269.3 |
| 6,554,071 B1 | 4/2003 | Reddy et al. ................ 166/293 |
| 6,555,507 B2 | 4/2003 | Chatterji et al. ............. 507/219 |
| 6,569,814 B1 | 5/2003 | Brady et al. ................. 507/201 |
| 6,582,819 B2 | 6/2003 | McDaniel et al. ........... 428/402 |
| 6,593,402 B2 | 7/2003 | Chatterji et al. ................ 524/7 |
| 6,599,863 B1 | 7/2003 | Palmer et al. ............... 507/219 |
| 6,608,162 B1 | 8/2003 | Chiu et al. ................... 528/129 |
| 6,616,320 B2 | 9/2003 | Huber et al. ................ 366/156.2 |
| 6,620,857 B2 | 9/2003 | Valet ............................ 522/42 |
| 6,626,241 B2 | 9/2003 | Nguyen ...................... 166/278 |
| 6,632,527 B1 | 10/2003 | McDaniel et al. ........... 428/402 |
| 6,632,892 B2 | 10/2003 | Rubinsztajn et al. ........ 525/476 |
| 6,642,309 B2 | 11/2003 | Komitsu et al. ............. 525/100 |
| 6,648,501 B2 | 11/2003 | Huber et al. ................. 366/301 |
| 6,659,179 B2 | 12/2003 | Nguyen ...................... 166/276 |
| 6,664,343 B2 | 12/2003 | Narisawa et al. ............ 525/474 |
| 6,667,279 B1 | 12/2003 | Hessert et al. ............... 507/225 |
| 6,668,926 B2 | 12/2003 | Nguyen et al. .............. 166/280 |
| 6,669,771 B2 | 12/2003 | Tokiwa et al. ............ 106/162.7 |
| 6,681,856 B1 | 1/2004 | Chatterji et al. ............. 166/294 |
| 6,686,328 B1 | 2/2004 | Binder ........................ 510/446 |
| 6,705,400 B1 | 3/2004 | Nugyen et al. .............. 166/281 |
| 6,710,019 B1 | 3/2004 | Sawdon et al. .............. 507/136 |
| 6,713,170 B1 | 3/2004 | Kaneka et al. ............... 428/323 |
| 6,725,926 B2 | 4/2004 | Nguyen et al. ........... 166/254.1 |
| 6,725,931 B2 | 4/2004 | Nguyen et al. ........... 166/280.2 |
| 6,729,404 B2 | 5/2004 | Nguyen et al. ........... 166/280.2 |
| 6,732,800 B2 | 5/2004 | Acock et al. ................ 166/308 |
| 6,745,159 B1 | 6/2004 | Todd et al. .................... 703/10 |
| 6,749,025 B1 | 6/2004 | Brannon et al. .......... 166/305.1 |
| 6,763,888 B1 | 7/2004 | Harris et al. .............. 166/305.1 |
| 6,766,858 B2 | 7/2004 | Nguyen et al. .............. 166/300 |
| 6,776,236 B1 | 8/2004 | Nguyen ...................... 166/279 |
| 6,832,650 B2 | 12/2004 | Nguyen et al. .............. 166/279 |
| 6,851,474 B2 | 2/2005 | Nguyen ...................... 166/279 |
| 6,887,834 B2 | 5/2005 | Nguyen et al. .............. 507/221 |
| 6,978,836 B2 | 12/2005 | Nguyen et al. .............. 166/295 |
| 7,114,570 B2 * | 10/2006 | Nguyen et al. .............. 166/295 |
| 2001/0016562 A1 | 8/2001 | Muir et al. ................... 507/201 |
| 2002/0043370 A1 | 4/2002 | Poe ........................ 166/250.07 |
| 2002/0048676 A1 | 4/2002 | McDaniel et al. ........... 428/404 |
| 2002/0070020 A1 | 6/2002 | Nguyen ...................... 166/295 |
| 2003/0006036 A1 | 1/2003 | Malone et al. ........... 166/250.12 |
| 2003/0060374 A1 | 3/2003 | Cooke, Jr. .................... 507/200 |
| 2003/0114314 A1 | 6/2003 | Ballard et al. ............... 507/100 |
| 2003/0130133 A1 | 7/2003 | Vollmer ....................... 507/100 |
| 2003/0131999 A1 | 7/2003 | Nguyen et al. .............. 166/280 |
| 2003/0148893 A1 | 8/2003 | Lungofer et al. ............ 507/200 |
| 2003/0186820 A1 | 10/2003 | Thesing ....................... 507/200 |
| 2003/0188766 A1 | 10/2003 | Banerjee et al. ................ 134/7 |
| 2003/0188872 A1 | 10/2003 | Nguyen et al. .............. 166/308 |
| 2003/0196805 A1 | 10/2003 | Boney et al. ................. 166/280 |
| 2003/0205376 A1 | 11/2003 | Ayoub et al. ............. 166/254.2 |
| 2003/0230408 A1 | 12/2003 | Acock et al. ................ 166/297 |
| 2003/0234103 A1 | 12/2003 | Lee et al. ..................... 166/293 |
| 2004/0000402 A1 | 1/2004 | Nguyen et al. .............. 166/280 |
| 2004/0014607 A1 | 1/2004 | Sinclair et al. ............... 507/200 |
| 2004/0014608 A1 | 1/2004 | Nguyen et al. .............. 507/200 |
| 2004/0040706 A1 | 3/2004 | Hossaini et al. ............. 166/278 |
| 2004/0040708 A1 | 3/2004 | Stephenson et al. ..... 166/280.1 |
| 2004/0040713 A1 | 3/2004 | Nguyen et al. .............. 166/295 |
| 2004/0048752 A1 | 3/2004 | Nguyen et al. .............. 507/269 |
| 2004/0055747 A1 | 3/2004 | Lee ............................. 166/278 |
| 2004/0106525 A1 | 6/2004 | Willbert et al. .............. 507/200 |
| 2004/0138068 A1 | 7/2004 | Rimmer et al. .............. 507/100 |

| | | | |
|---|---|---|---|
| 2004/0149441 A1 | 8/2004 | Nguyen et al. ........... 166/280.1 |
| 2004/0152601 A1 | 8/2004 | Still et al. .................... 507/100 |
| 2004/0177961 A1 | 9/2004 | Nguyen et al. ........... 166/280.2 |
| 2004/0019496 A1 | 10/2004 | Nguyen et al. .............. 166/295 |
| 2004/0206499 A1 | 10/2004 | Nguyen et al. ........... 166/280.2 |
| 2004/0211559 A1 | 10/2004 | Nguyen et al. .............. 166/276 |
| 2004/0211561 A1 | 10/2004 | Nguyen et al. ........... 166/280.2 |
| 2004/0221992 A1 | 11/2004 | Nguyen et al. .............. 166/295 |
| 2004/0231845 A1 | 11/2004 | Cooke, Jr. ................... 166/279 |
| 2004/0231847 A1 | 11/2004 | Nguyen et al. .............. 166/295 |
| 2004/0256099 A1 | 12/2004 | Nguyen et al. .............. 166/249 |
| 2004/0261995 A1 | 12/2004 | Nguyen et al. .............. 166/279 |
| 2004/0261997 A1 | 12/2004 | Nguyen et al. .............. 166/281 |
| 2005/0000731 A1 | 1/2005 | Nguyen et al. ................ 175/57 |
| 2005/0006093 A1 | 1/2005 | Nguyen et al. .............. 166/281 |
| 2005/0006095 A1 | 1/2005 | Justus et al. ................. 166/295 |
| 2005/0006096 A1 | 1/2005 | Nguyen et al. .............. 166/295 |
| 2005/0045326 A1 | 3/2005 | Nguyen ...................... 166/278 |

FOREIGN PATENT DOCUMENTS

| | | |
|---|---|---|
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 2004/037946 A1 | 5/2004 |
| WO | WO 2004/038176 A1 | 5/2004 |
| WO | WO 2005/021928 A2 | 3/2005 |

OTHER PUBLICATIONS

Halliburton, *CoalStim*[SM] *Service, Helps Boost Cash Flow From CBM Assets*, Stimulation,HO3679 Oct. 2003, 2003, Halliburton Communications.

Halliburton, *Conductivity Endurance Technology For High Permeability Reservoirs, Helps Prevent Intrusion of Formation Material into the Proppant Pack for Improved Long-term Production*, Stimulation, 2003, Halliburton Communications.

Halliburton, Expedite® Service, *A Step-Change Improvement Over Conventional Proppant Flowback Control Systems. Provides Up to Three Times the Conductivity of RCPs.*, Stimulation, HO3296 May 2004, 2004, Halliburton Communications.

Halliburton Technical Flier—Multi Stage Frac Completion Methods, 2 pages.

Halliburton "*CobraFrac*[SM] *Service, Coiled Tubing Fracturing—Cost-Effective Method for Stimulating Untapped Reserves*", 2 pages, 2004.

Halliburton "*CobraJetFrac*[SM] *Service, Cost-Effective Technology That Can Help Reduce Cost per BOE Produced, Shorten Cycle time and Reduce Capex*".

Halliburton Cobra Frac Advertisement, 2001.

Halliburton "SurgiFrac^SM Service, a Quick and cost-Effective Method to Help Boost Production From Openhole Horizonal Completions", 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, 2004, Halliburton Communications.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, "*Water and Gas Cyclic Pulsing Method for Improved Oil Recovery*", SPE 3005, 1971.

Peng et al., "*Pressure Pulsing Waterflooding in Dual Porosity Naturally Fractured Reservoirs*" SPE 17587, 1988.

Dusseault et al, "*Pressure Pulse Workovers in Heavy Oil*", SPE 79033, 2002.

Yang et al., "*Experimental Study on Fracture Initiation By Pressure Pulse*", SPE 63035, 2000.

Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.

Advances in Polymer Science, vol. 157, "*Degradable Aliphatic Polyesters*" edited by A.-C. Albertson, 2001.

Gorman, *Plastic Electric: Lining up the Future of Conducting Polymers* Science News, vol. 163, May 17, 2003.

Gidley et al., "*Recent Advances in Hydraulic Fracturing*," Chapter 6, pp. 109-130, 1989.

Simmons et al., "*Poly(phenyflactide): Synthesis, Characterization, and Hydrolytic Degradation, Biomacromolecules*", vol. 2, No. 2, pp. 658-663, 2001.

Yin et al., "*Preparation and Characterization of Substituted Polylactides*", Americal Chemical Society, vol. 32, No. 23, pp. 7711-7718, 1999.

Yin et al., "*Synthesis and Properties of Polymers Derived from Substituted Lactic Acids*", American Chemical Society, Ch. 12, pp. 147-159, 2001.

Cantu et al., "*Laboratory and Field Evaluation of a Combined Fluid-Loss Control Additive and Gel Breaker for Fracturing Fluids*," SPE 18211, 1990.

Love et al., "*Selectively Placing Many Fractures in Openhole Horizontal Wells Improves Production*", SPE 50422, 1998.

McDaniel et al, "*Evolving New Stimulation Process Proves Highly Effective in Level 1 Dual-Lateral Completion*" SPE 78697, 2002.

Albertsson et al., "*Aliphatic Polyesters: Synthesis, Properties and Applications*", Advances in Polymer Science, vol. 57 Degradable Aliphatic Polyesters, 2002.

Dechy-Cabaret et al., "*Controlled Ring-Operated Polymerization of Lactide and Glycolide*" American Chemical Society, Chemical Reviews, A-Z, AA-AD, 2004.

Funkhouser et al., "*Synthetic Polymer Fracturing Fluid For High-Temperature Applications*", SPE 80236, 2003.

*Chelating Agents*, Encyclopedia of Chemical Technology, vol. 5 (764-795).

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @www.cdxgas.com/solution.html, printed pp. 1-2.

CDX Gas, "*What is Coalbed Methane?*" CDX, LLC. Available @www.cdxgas.com/what.html, printed p. 1.

Halliburton brochure entitled "H2Zero™ Service Introducing The Next Generation of cost-Effective Conformance Control Solutions", 2002.

Halliburton brochure entitled INJECTROL® A Component: 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

Foreign search report and opinion (CPW 21582 EP), Mar. 11, 2005.

* cited by examiner

COMPOSITIONS AND METHODS FOR PARTICULATE CONSOLIDATION

CROSS-REFERENCE TO RELATED APPLICATION

This Application is a continuation in part of U.S. application Ser. No. 10/408,800 entitled "Methods and Compositions for Stabilizing Unconsolidated Subterranean Formations," filed on Apr. 7, 2003 now U.S. Pat. No. 7,114,570.

BACKGROUND

The present invention relates to compositions and methods for stabilizing particulates in subterranean formations over a wide temperature range. More particularly, the present invention relates to integrated consolidation fluids and methods of using integrated consolidation fluids to consolidate particulates within a subterranean formation.

Hydrocarbon wells are often located in subterranean formations that contain unconsolidated particulate matter that can migrate with mobile fluids within the formations such as oil, gas, or water. The presence of particulate matter, such as sand, in the produced fluids is disadvantageous and undesirable in that the particulates may abrade pumping and other producing equipment and reduce the fluid production capabilities of a producing formation. Unconsolidated areas within a subterranean formation include those that contain loose particulates that are readily entrained by produced fluids and those wherein the particulates making up the zone are bonded together with insufficient bond strength to withstand the forces produced by mobile fluids within the subterranean formation.

One method of controlling unconsolidated particulates involves placing a filtration bed of gravel near the well bore in order to present a physical barrier to the transport of unconsolidated particulate matter with the production of hydrocarbons. Typically, such so-called "gravel packing operations" involve the pumping and placement of a quantity of a desired particulate into the unconsolidated formation adjacent to the well bore. Such packs are time consuming and expensive to install. Weakly consolidated formations also have been treated by creating fractures in the formations and depositing proppant in the fractures wherein the proppant is consolidated within the fractures into hard, permeable masses using a resin composition to reduce the migration of particulates. In some situations the processes of fracturing and gravel packing are combined into a single treatment to stimulate hydrocarbon production while inhibiting particulate matter production with an annular gravel pack. Such treatments are often referred to as "frac pack" operations.

Another method used to control particulate matter in unconsolidated formations involves consolidating unconsolidated subterranean producing zones into hard permeable masses by preflushing the formation, applying a hardenable resin composition, applying a spacer fluid, applying an external catalyst to cause the resin to set, and applying an afterflush fluid to remove excess resin from the pore spaces of the zones. Such multiple-component applications, however, may be problematic. For example, when an insufficient amount of spacer fluid is used between the application of the hardenable resin and the application of the external catalyst, the resin may come into contact with the external catalyst in the well bore itself rather than in the unconsolidated subterranean producing zone. When resin is contacted with an external catalyst an exothermic reaction occurs that may result in rapid polymerization. The polymerization may damage the formation by plugging the pore channels, may halt pumping when the well bore is plugged with solid material, or may even result in a downhole explosion as a result of the heat of polymerization. Likewise, using these conventional processes to treat long intervals of unconsolidated regions is often not practical due to the difficulty in determining if the entire interval has been treated with both the resin and the catalyst. Also, the temperature of the subterranean formation may hamper the ability of the hardenable resin to cure. Hence, multiple hardenable resins may be needed depending on the subterranean formation's temperature at the region being treated.

SUMMARY

The present invention relates to compositions and methods for stabilizing particulates in subterranean formations over a wide temperature range. More particularly, the present invention relates to integrated consolidation fluids and methods of using integrated consolidation fluids to consolidate particulates within a subterranean formation.

One embodiment of the present invention provides a method of consolidating proppant particulates placed in a subterranean formation comprising substantially coating proppant particulates with an integrated consolidation fluid to create coated proppant particulates wherein the integrated consolidation fluid comprises a hardenable resin component and a hardening agent component, and wherein the hardening agent component comprises a piperazine, a derivative of piperazine, or a combination thereof; placing the coated proppant particulates into a portion of a subterranean formation; and, allowing the integrated consolidation fluid to substantially cure and consolidate at least a portion of the proppant particulates.

Another embodiment of the present invention provides a method of stabilizing a portion of a subterranean formation comprising applying a preflush solution to the subterranean formation, wherein the preflush solution comprises an aqueous liquid and a surfactant; applying an integrated consolidation fluid to the subterranean formation, wherein the integrated consolidation fluid comprises a hardenable resin component and a hardening agent component, and wherein the hardening agent component comprises a piperazine, a derivative of piperazine, or a combination thereof; and, allowing the integrated consolidation fluid to substantially cure and consolidate at least a portion of the subterranean formation.

Another embodiment of the present invention provides a method of reducing the production of particulates from a subterranean formation comprising applying a preflush solution to the subterranean formation, wherein the preflush solution comprises an aqueous liquid and a surfactant; applying an integrated consolidation fluid to the subterranean formation, wherein the integrated consolidation fluid comprises a hardenable resin component and a hardening agent component, and wherein the hardening agent component comprises a piperazine, a derivative of piperazine, or a combination thereof; and, allowing the integrated consolidation fluid to substantially cure and consolidate at least a portion of the subterranean formation.

Another embodiment of the present invention provides an integrated consolidation fluid capable of consolidating a subterranean formation comprising a hardenable resin component and a hardening agent component, wherein the hardening agent component comprises a piperazine, a derivative of piperazine, or a combination thereof.

Another embodiment of the present invention provides a proppant coated with an integrated consolidation fluid comprising a hardenable resin component and a hardening agent component, wherein the hardening agent component comprises a piperazine, a derivative of piperazine, or a combination thereof.

The features and advantages of the present invention will be readily apparent to those skilled in the art upon a reading of the description of the embodiments that follows.

DESCRIPTION

The present invention relates to compositions and methods for stabilizing particulates in subterranean formations over a wide temperature range. More particularly, the present invention relates to integrated consolidation fluids and methods of using integrated consolidation fluids to consolidate particulates within a subterranean formation.

The present invention provides integrated consolidation fluids that are capable of consolidating unconsolidated particulates. The integrated consolidation fluids of the present invention are suitable for consolidating proppant particulates placed within a subterranean formation, or for consolidating unconsolidated portions of a subterranean formation. Moreover, the integrated consolidation fluids of the present invention are capable of curing over a wide temperature range and do not require the use of an external catalyst. While the compositions and methods of the present invention are useful in a variety of well completion and remedial operations, they are particularly useful in consolidating unconsolidated subterranean formations bordering well bores and fractures, as well as for consolidating proppants placed in subterranean formations.

The integrated consolidation fluids of the present invention comprise a hardenable resin component and a hardening agent component. The term "integrated consolidation fluid" refers to a consolidation fluid that may be applied in one step. That is, in the case of consolidating an unconsolidated subterranean formation, neither a spacer fluid nor an external catalyst is required for the fluid to effect consolidation. Furthermore, the integrated consolidation fluids of the present invention can be used to coat proppants prior to placement in a subterranean formation in order to effect consolidation of the proppants after they are placed in the subterranean formation. The integrated consolidation fluids of the present invention are generally capable of consolidating over a wide rage of temperatures from about 70° F. to about 350° F.

In certain embodiments, the integrated consolidation fluids of the present invention may comprise a solvent. This solvent component may be used to adjust the viscosities of the integrated consolidation fluids of the present invention to ensure that they are able to sufficiently penetrate the unconsolidated portions of the subterranean formation. For example, where the particulates being consolidated are formation particulates surrounding a well bore, from about 1 foot to about 3 feet of penetration into the formation from the well bore may be desired. Where the particulates being consolidated are those making the face of a propped fracture, for example, from about 0.25 inches to about 2 inches of penetration into the fracture wall is generally sufficient. To achieve the desired level of penetration, the integrated consolidation fluid viscosity is preferably below 100 cP, more preferably below 40 cP, and most preferably below 10 cP. Achieving the desired viscosity will generally dictate a resin to solvent ratio ranging from about 1:0.2 to about 1:20. It is within the ability of one skilled in the art, with the benefit of this disclosure, to use a sufficient amount of a suitable solvent to achieve the desired viscosity and, thus, to achieve the preferred penetration into the subterranean formation.

The hardenable resin component of the integrated consolidation fluids of the present invention is comprised of a hardenable resin and an optional solvent. The solvent may be added to the resin to reduce its viscosity for ease of handling, mixing, and transferring. It is within the ability of one skilled in the art, with the benefit of this disclosure, to determine whether a solvent is needed and, if so, how much may be needed to achieve a suitable viscosity. Factors that may affect this decision include the geographic location of the well and the surrounding weather conditions. An alternate way to reduce the viscosity of the hardenable resin is to heat it. This method avoids the use of a solvent altogether, which may be desirable in certain wells.

Examples of hardenable resins that can be used in the hardenable resin component include, but are not limited to, organic resins such as bisphenol A diglycidyl ether resin, butoxymethyl butyl glycidyl ether resin, bisphenol A-epichlorohydrin resin, polyepoxide resin, novolak resin, polyester resin, phenol-aldehyde resin, urea-aldehyde resin, furan resin, urethane resin, a glycidyl ether, and combinations thereof. The hardenable resin used is included in the hardenable resin component in an amount in the range of from about 60% to about 95% by weight of the hardenable resin component.

Any solvent that is compatible with the hardenable resin and achieves the desired viscosity effect is suitable for use in the hardenable resin component of the integrated consolidation fluids of the present invention. Preferred solvents are those having high flash points (e.g., about 125° F.) because of, inter alia, environmental factors. As described above, use of a solvent in the hardenable resin component is optional but may be desirable to reduce the viscosity of the hardenable resin component for ease of handling, mixing, and transferring. It is within the ability of one skilled in the art, with the benefit of this disclosure, to determine if and how much solvent is needed to achieve a suitable viscosity. Solvents suitable for use in the present invention include, but are not limited to, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. The amount of the solvent used in the hardenable resin component is in the range of from about 0.1% to about 30% by weight of the hardenable resin component.

The hardening agent component of the integrated consolidation fluids of the present invention is comprised of a hardening agent; a silane coupling agent; a surfactant for, inter alia, facilitating the coating of proppant prior to placement in a subterranean formation and easing the flow of the integrated consolidation fluid to contact points between particulates and-or proppant within an unconsolidated subterranean formation; an optional hydrolysable ester for, inter alia, breaking gelled servicing fluid films on particulates and-or proppant; and an optional liquid carrier fluid for, inter alia, reducing the viscosity of the hardening agent component. It is within the ability of one skilled in the art, with the benefit of this disclosure, to determine whether a liquid carrier fluid is needed and, if so, how much liquid carrier fluid is needed to achieve a suitable viscosity.

Hardening agents suitable for use in the hardening agent component of the integrated consolidation fluids of the present invention include, but are not limited to, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. The hardening agent is included in the hardening agent component in an amount in the range of from about 5% to about 60% by weight of the hardening agent component. In some examples, the hardening agent is included in the hardening agent component in an amount in the range of from about 40% to about 60% by weight of the hardening agent component. The chosen hardening agent often effects the range of temperatures over which a hardenable resin is able to cure. For example, hardening agents that comprise piperazine or a derivative of piperazine have been shown capable of curing various hardenable resins from temperatures as low as about 70° F. to as high as about 350° F. By way of example, for temperatures closer to 70° F. a mixture of bisphenol A diglycidyl ether resin and bisphenol A-epichlorohydrin resin may be suitable and for temperatures closer to 350° F. a mixture of aliphatic glycidyl ether, bisphenol A/novolak epoxy resin, and bisphenol A-epichlorohydrin resin may be suitable.

The silane coupling agent may be used, inter alia, to act as a mediator to help bond the resin to formation particulates and-or proppant. Examples of suitable silane coupling agents include, but are not limited to, N-beta-(aminoethyl)-gamma-aminopropyl trimethoxysilane, N-2-(aminoethyl)-3-aminopropyltrimethoxysilane, 3-glycidoxypropyltrimethoxysilane, and combinations thereof. The silane coupling agent is included in the hardening agent component in an amount in the range of from about 0.1% to about 3% by weight of the hardening agent component.

Any surfactant compatible with the hardening agent and capable of facilitating the coating of the resin onto particles in the subterranean formation may be used in the hardening agent component of the integrated consolidation fluids of the present invention. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,733, issued to Todd et al. on Nov. 6, 2001, the relevant disclosure of which is incorporated herein by reference. The surfactant or surfactants used are included in the liquid hardening agent component in an amount in the range of from about 1% to about 10% by weight of the liquid hardening agent component.

While not required, examples of hydrolysable esters that can be used in the hardening agent component of the integrated consolidation fluids of the present invention include, but are not limited to, a mixture of dimethylglutarate, dimethyladipate, and dimethylsuccinate; sorbitol; catechol; dimethylthiolate; methyl salicylate; dimethyl salicylate; dimethylsuccinate; ter-butylhydroperoxide; and combinations thereof. When used, a hydrolysable ester is included in the hardening agent component in an amount in the range of from about 0.1% to about 3% by weight of the hardening agent component.

Use of a liquid carrier fluid in the hardening agent component of the integrated consolidation fluids of the present invention is optional and may be used to reduce the viscosity of the hardening agent component for ease of handling, mixing, and transferring. It is within the ability of one skilled in the art, with the benefit of this disclosure, to determine if and how much liquid carrier fluid is needed to achieve a viscosity suitable to the subterranean conditions. Any suitable carrier fluid that is compatible with the hardening agent and achieves the desired viscosity effects is suitable for use in the present invention. In general, suitable liquid carrier fluids include those having high flash points (e.g., above about 125° F.). Examples of liquid carrier fluids suitable for use in the present invention include, but are not limited to, diethylene glycol monomethyl ether, methanol, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and combinations thereof. The liquid carrier fluid is present in the hardening agent component in an amount in the range of from about 0.1% to about 60% by weight of the hardening agent component.

In one embodiment, the present invention provides methods for consolidating proppant placed in a subterranean formation that comprise coating the proppant with the integrated consolidation fluids of the present invention; introducing the coated proppant in a servicing fluid to create a coated proppant slurry; placing the coated proppant slurry into the subterranean formation at a desired location; and allowing the coated proppant to consolidate. Such methods can be utilized in conjunction with a variety of subterranean well operations, including, but not limited to, fracturing and gravel packing subterranean formations.

Any proppant suitable for use in a subterranean operation may be used in accordance with the present invention, including, but not limited to, sand; bauxite; ceramic materials; glass materials; polymer materials; "TEFLON™" materials; nut shell pieces; seed shell pieces; cured resinous particulates comprising nut shell pieces; cured resinous particulates comprising seed shell pieces; fruit pit pieces; cured resinous particulates comprising fruit pit pieces; processed wood; composite particulates prepared from a binder with filler particulate including silica, alumina, fumed carbon, carbon black, graphite, mica, titanium dioxide, metasilicate, calcium silicate, kaolin, talc, zirconia, boron, fly ash, hollow glass microspheres, and solid glass; and combinations thereof. The proppant used may have a particle size in the range of from about 2 to about 400 mesh, U.S. Sieve Series. In certain embodiments, the proppant is graded sand having a particle size in the range of from about 10 to about 70 mesh, U.S. Sieve Series. Preferred sand particle size distribution ranges include one or more of 10-20 mesh, 20-40 mesh, 40-60 mesh or 50-70 mesh, depending on the particle size and distribution of the formation particulates to be screened out by the proppant.

Proppant may be coated with an integrated consolidation fluid of the present invention by any suitable technique; such as by batch mixing methods as the hardenable resin component and hardening agent component are metered directly into the proppant slurry or by coating the hardenable resin composition directly onto the dry proppant through use of auger action. In some embodiments, the servicing fluid containing proppant coated with the integrated consolidation fluids of the present invention may be prepared in a substantially continuous, on the fly, manner. The amount of integrated consolidation fluids of the present invention coated on the proppant ranges from about 0.1% to about 5% by weight of the proppant. The concentration of the integrated consolidation fluids of the present invention used to coat the proppant is in the range of from about 1% to about 3% by weight of the proppant.

Proppant coated with an integrated consolidation fluid of the present invention can be delivered downhole using any servicing fluid suitable for delivering proppant, e.g., a viscous servicing fluid. Similarly, proppant coated with the integrated consolidation fluids of the present invention can be placed in a subterranean formation using any suitable technique for placing proppant, e.g., gravel packing, fracturing, or frac-pack. Any servicing fluid known in the art may be used in the present invention, including aqueous gels, viscoelastic surfactant gels, oil gels, and emulsions. Suitable aqueous gels are generally comprised of water and one or more gelling agents. Suitable emulsions can be comprised of two immiscible liquids such as an aqueous gelled liquid and a liquefied, normally gaseous, fluid, such as carbon dioxide or nitrogen. In exemplary embodiments of the present invention, the fracturing fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, fracturing fluid, inter alia, reduces fluid loss and allows the fracturing fluid to transport significant quantities of suspended proppant particles. The water used to form the fracturing fluid may be salt water, brine, or any other aqueous liquid that does not adversely react with the other components. The density of the water can be increased to provide additional particle transport and suspension in the present invention.

One embodiment of the present invention provides methods for consolidating or stabilizing a subterranean formation that comprise applying a preflush solution to the unconsolidated subterranean formation, applying an integrated consolidation fluid of the present invention to a portion of the unconsolidated formation, and optionally applying an afterflush fluid to the subterranean formation to, inter alia, remove excess consolidation fluid from the pore spaces and the well bore.

Preflush fluids suitable for use in the methods of the present invention comprise an aqueous liquid, a surfactant, and an optional mutual solvent. The preflush solution, inter alia, readies the formation to receive the integrated consolidation fluid and removes oils that may impede the integrated consolidation fluid from making contact with the formation particles. When used, the mutual solvent should be soluble in both oil and water and be capable, inter alia, of removing hydrocarbons deposited on particulates. Examples of suitable mutual solvents include, but are not limited to, glycol ether solvents such as ethyleneglycolmonobutyl ether, diethylene glycol monomethyl ether, diethylene glycol dimethyl ether, dipropylene glycol methyl ether, and combinations thereof. The aqueous liquid may be salt water, brine, or any other aqueous liquid that does not adversely react with the other components used in accordance with this invention. Any surfactant compatible with the aqueous liquid and capable of aiding the hardenable resin in coating the surface of unconsolidated particles of the subterranean formation may be suitable for use in the present invention. Examples of surfactants suitable for use in the preflush fluids used in the methods of the present invention include, but are not limited to, ethoxylated nonyl phenol phosphate esters, one or more cationic surfactants, and one or more nonionic surfactants, and an alkyl phosphonate surfactant (e.g., a $C_{12}$-$C_{22}$ alkyl phosphonate surfactant). Mixtures of one or more cationic and nonionic surfactants are suitable and examples are described in U.S. Pat. No. 6,311,773, issued to Todd et al. on Nov. 6, 2001, the relevant disclosure of which is incorporated herein by reference.

The afterflush fluids suitable for use in the methods of the present invention comprise an aqueous liquid or an inert gas. Where the afterflush fluid is an aqueous liquid, it may be salt water, brine, or any other aqueous liquid that does not adversely react with the other components used in accordance with this invention. Where an aqueous afterflush fluid is used, a volume of about 1 time to about 5 times the volume of the integrated consolidation fluid used is generally suitable for use in the methods of the present invention. Moreover, in some subterranean formations, particularly gas-producing subterranean formations, it may be advantageous to use afterflush fluids that are inert gases, such as nitrogen, rather than an aqueous solution. Such afterflush fluids may prevent adverse interactions between the afterflush fluid and the formation. The afterflush fluid acts, inter alia, to displace the curable resin from the well bore, to remove curable resin from the pore spaces inside the subterranean formation thereby restoring permeability, and to leave behind some resin at the contact points between formation sand particulate to form a permeable, consolidated formation.

In some embodiments, the afterflush fluid further comprises a surfactant. When used, any surfactant compatible with the aqueous liquid and capable of aiding the hardenable resin in coating the surface of unconsolidated particles of the subterranean formation may be suitable for use in the present invention. Examples of surfactants suitable for use in the preflush fluids used in the methods of the present invention include, but are not limited to, ethoxylated nonyl phenol phosphate esters, one or more cationic surfactants, and one or more nonionic surfactants, and an alkyl phosphonate surfactant (e.g., a $C_{12}$-$C_{22}$ alkyl phosphonate surfactant). Mixtures of one or more cationic and nonionic surfactants are suitable and examples are described in U.S. Pat. No. 6,311,773, issued to Todd et al. on Nov. 6, 2001, the relevant disclosure of which is incorporated herein by reference.

To facilitate a better understanding of the present invention, the following examples of specific embodiments are given. In no way should the following examples be read to limit, or to define, the scope of the invention.

EXAMPLE 1

Two different proppant particulates were used to test the consolidation of the proppant particulates coated with an exemplary integrated consolidation fluid. Two-hundred-fifty grams of 20/40 mesh Brady sand (for low temperature wells, e.g., less than 200° F.) or bauxite proppant (for higher temperature wells, e.g., 200° F. and above) was dry coated with 7.5 mL (i.e., 3% by weight of proppant) of an exemplary integrated consolidation fluid. The exemplary integrated consolidation fluid included 3.75 mL of the hardenable resin component and 3.75 mL of the hardening agent component.

The coated particulates from above were then mixed in brine, or in a linear gel fluid of either hydroxyethyl cellulose (HEC) or carboxymethylhydroxypropyl guar (CMHPG) fluid. The resultant slurry was then transferred and packed in a brass flow cell without closure stress and cured in a heated oven at a designated temperature and time. Consolidated cores were then obtained from the proppant pack to determine the unconfined compressive strength (UCS) as a means of consolidation strength measurement for the proppant pack.

The results of the tests are displayed in Table 1, below:

TABLE 1

| Mixed resin concentration coated on proppant (%) | Proppant type | Carrier fluid | Cure temperature (° F.) | Cure time (hours) | UCS (psi) |
|---|---|---|---|---|---|
| 1 | 20/40 Brady | HEC | 175 | 20 | 180 |
| 2 | 20/40 Brady | HEC | 175 | 20 | 565 |
| 3 | 20/40 Brady | HEC | 175 | 20 | 1,300 |
| 2 | 20/40 Bauxite | CMHPG | 325 | 3 | 225 |
| 2 | 20/40 Bauxite | CMHPG | 325 | 6 | 215 |
| 3 | 20/40 Bauxite | CMHPG | 325 | 3 | 785 |
| 3 | 20/40 Bauxite | CMHPG | 325 | 6 | 690 |
| 3 | 20/40 Bauxite | CMHPG | 325 | 20 | 1010 |
| 3 | 20/40 Bauxite | CMHPG | 325 | 168 | 1120 |

EXAMPLE 2

Sand columns were prepared by packing from the bottom of tapered Teflon sleeve 10 grams of 40/60-mesh Ottawa sand, 80 grams of a sand mixture which is used to simulate formation sand, 10 grams of 40/60-mesh sand on top of the sand mixture. Wired mesh screens were installed at both ends of the Teflon sleeve. The sand mixture was prepared from 88% of 70/170-mesh sand, 10% of silica flour, and 2% smectite clay, all by weight of sand mixture. In the test labeled No. 3 (below) only 70/170-mesh sand was used as formation sand. The consolidating composition was diluted with methanol in a 1 to 1 ratio. A volume of 5% ammonium chloride brine (equals to 5 pore volumes of sand column) was pre-flushed into the column, followed by 2 pore volumes of diluted consolidating composition, and an afterflush of 3 pore volumes of 5% ammonium chloride brine. Both preflush and afterflush brine contained 1% of a cationic surfactant. The initial permeability of the sand column was determined during preflush. The treated sand column was then placed in the oven and cured at temperature for desired cure time. After curing, the permeability of the consolidated sand column was performed to determine the retained permeability. Consolidated cores were then obtained and unconfined compressive strengths (UCS) were measured. Table 2 provides a summary result of UCS and percent regained permeability.

TABLE 2

| Test No. | Cure Temperature (° F.) | Cure Time (hrs) | % Retained Permeability | UCS (psi) |
|---|---|---|---|---|
| 1 | 175 | 72 | NA | 240 |
| 2 | 175 | 16 | 65 | 325 |
| 3* | 175 | 16 | NA | 3010 |
| 4 | 260 | 20 | 55 | 255 |
| 5 | 175 | 16 | NA | 1540 |
| 6 | 175 | 16 | NA | 2080 |

What is claimed is:

1. A method of treating a portion of a subterranean formation comprising:
   applying a preflush solution to the subterranean formation, wherein the preflush solution comprises an aqueous liquid and a surfactant;
   applying an integrated consolidation fluid to the subterranean formation, wherein the integrated consolidation fluid comprises a hardenable resin component and a hardening agent component, and wherein the hardening agent component comprises at least one hardenable agent component selected from the group consisting of a piperazine, a derivative of a piperazine, and any combination thereof; and
   consolidating at least a portion of the subterranean formation.

2. The method of claim 1 wherein the preflush solution further comprises a mutual solvent.

3. The method of claim 2 wherein the mutual solvent comprises at least one mutual solvent selected from the group consisting of: diethylene glycol monomethyl ether, diethylene glycol dimethyl ether; dipropylene glycol methyl ether; and any combination thereof.

4. The method of claim 1 wherein the aqueous liquid component of the preflush solution comprises at least one aqueous liquid component selected from the group consisting of: salt water; a brine; and any combination thereof.

5. The method of claim 1 wherein the surfactant component of the preflush solution comprises at least one surfactant selected from the group consisting of: an ethoxylated nonyl phosphate ester; a cationic surfactant; a nonionic surfactant; an alkyl phosphate surfactant; a $C_{12}$-$C_{22}$ alkyl phosphonate surfactant; and any combination thereof.

6. The method of claim 1 wherein the hardenable resin component comprises at least one hardenable resin selected from the group consisting of: a bisphenol A diglycidyl ether resin; a butoxymethyl butyl glycidyl ether resin; a bisphenol A epichlorohydrin resin; a polyepoxide resin; a novolak resin; a polyester resin; a phenol aldehyde resin; a urea aldehyde resin; a furan resin; a urethane resin; a glycidyl ether; and any combination thereof.

7. The method of claim 6 wherein the hardenable resin component further comprises a solvent selected from the group consisting of: a butyl lactate; butylglycidyl ether; dipropylene glycol methyl ether; dipropylene glycol dimethyl ether; dimethyl formamide; diethyleneglycol methyl ether; ethyleneglycol butyl ether; diethylglycol butyl ether; a propylene carbonate; methanol; butyl alcohol; d-limonene; a fatty acid methyl ester; and any combination thereof.

8. The method of claim 7 wherein the solvent is present in the hardenable resin component in an amount of amount 0.1% to about 30% by weight of the hardenable resin component.

9. The method of claim 6 wherein the hardenable resin is included in the hardenable resin component in an amount of about 60% to about 95% by weight of the hardenable resin component.

10. The method of claim 1 wherein the hardening agent component further comprises a at least one hardening agent component selected from the group consisting of: an aminoethylpiperazine; a 2H-pyrrole; a pyrrole; an imidazole; a pyrazole; a pyridine; a pyrazine; a pyrimidine; a pyridazine; an indolizine; an isoindole; a 3H-indole; an indole; a 1H-indazole; a purine; a 4H-quinolizine; a quinoline; an isoquinoline; a phthalazine; a naphthyridine; a quinoxaline; a quinazoline; a 4H-carbazone; a carbazole; a beta-carboline; a phenanthridine; an acridine; a phenathroline; a phenazine; an imidazolidine; an phenoxazine; a cinnoline; a pyrrolidine; a pyrroline; an imidazoline; a piperidine; an indoline; an isoindoline; a quinuclindine; a morpholine; an azocine; an azepine; a 2H-azepine; a 1,3,5-triazine; a thiazole; a pteridine; a dihydroquinoline; a hexa methylene imine; an indazole; an amine; an aromatic amine; a polyamine; an aliphatic amine; a cyclo-aliphatic amine; an amide; a polyamide; a 2-ethyl-4-methyl imidazole; a 1,1,3-trichlorotrifluoroacetone; and any combination thereof.

11. The method of claim 1 wherein the hardening agent component further comprises a component selected from the group consisting of: a hardening agent; a silane coupling agent; a surfactant; and any combination thereof.

12. The method of claim 11 wherein the hardening agent component further comprises a component selected from the group consisting of: a hydrolyzable ester; a liquid carrier fluid; and any combination thereof.

13. The method of claim 12 wherein the hydrolysable ester comprises at least one hydrolyzable ester selected from the group consisting of: a mixture of dimethylglutarate, dimethyladipate, and dimethylsuccinate; sorbitol; catechol; dimethylthiolate; methyl salicylate; dimethyl salicylate; dimethylsuccinate; ter-butylhydroperoxide; and any combination thereof.

14. The method of claim 12 wherein the hydrolysable ester is present in the hardening agent component in an amount of about 0.1% to about 3% by weight of the hardening agent component.

15. The method of claim 12 wherein the liquid carrier fluid comprises at least one liquid carrier fluid selected from the group consisting of: a diethylene glycol monomethyl ether; methanol; a dipropylene glycol methyl ether; a dipropylene glycol dimethyl ether; a dimethyl formamide; a diethyleneglycol methyl ether; an ethyleneglycol butyl ether; a diethyleneglycol butyl ether; a propylene carbonate; d-limonene; a fatty acid methyl ester; and any combination thereof.

16. The method of claim 12 wherein the liquid carrier fluid is present in the hardening agent component in an amount of about 0.1% to about 60% by weight of the hardening agent component.

17. The method of claim 11 wherein the hardening agent is present in the hardening agent component in an amount of about 40% to about 60% by weight of the hardening agent component.

18. The method of claim 11 wherein the silane coupling agent comprises at least one silane coupling agent selected from the group consisting of: an N-beta-(aminoethyl)-gamma-aminopropyl trimethoxysilane; an N-2-(aminoethyl)-3-aminopropyltrimethoxysilane; a 3-glycidoxypropyltrimethoxysilane; and any combination thereof.

19. The method of claim 11 wherein the silane coupling agent is present in the hardening agent component in an amount of about 0.1% to about 3% by weight of the hardening agent component.

20. The method of claim 11 wherein the surfactant is selected from the group consisting of: an alkyl phosphonate surfactant; a $C_{12}$-$C_{22}$ alkyl surfactant; an ethoxylated nonyl phenol phosphate ester; a cationic surfactant; a nonionic surfactant; and any combination thereof.

21. The method of claim 11 wherein the surfactant is present in the hardening agent component in an amount of about 1% to about 10% by weight of the liquid hardening agent component.

22. The method of claim 1 further comprising, after applying an integrated consolidation fluid to the subterranean formation and before allowing the integrated consolidation fluid to substantially cure, applying an afterflush fluid to the subterranean formation, wherein the afterflush is an aqueous liquid or an inert gas.

23. The method of claim 22 wherein the afterflush fluid further comprises a surfactant selected from the group consisting of: an ethoxylated nonyl phenol phosphate ester; a cationic surfactant; a nonionic surfactant; an alkyl phosphonate surfactant; a $C_{12}$-$C_{22}$ alkyl phosphonate surfactant; and any combination thereof.

24. The method of claim 22 wherein the aqueous liquid is selected from the group consisting of: salt water; a brine; and any combination thereof.

25. The method of claim 22 wherein the inert gas comprises nitrogen.

26. The method of claim 22 wherein the afterflush fluid is used in a volume of about 1 to about 5 times the volume of the integrated consolidation fluid used.

* * * * *